(12) United States Patent
Chou

(10) Patent No.: US 7,069,785 B2
(45) Date of Patent: Jul. 4, 2006

(54) THERMAL BUBBLE TYPE MICRO INERTIAL SENSOR

(75) Inventor: Bruce C. S. Chou, Hsin Chu (TW)

(73) Assignee: Lightuning Tech Inc., Hsinchu (TW)

( * ) Notice: Subject to any disclaimer, the term of this patent is extended or adjusted under 35 U.S.C. 154(b) by 0 days.

(21) Appl. No.: 10/718,583

(22) Filed: Nov. 24, 2003

(65) Prior Publication Data
US 2004/0103720 A1 Jun. 3, 2004

(30) Foreign Application Priority Data
Nov. 29, 2002 (TW) ................. 91134748 A

(51) Int. Cl.
*G01P 15/08* (2006.01)
*G01P 15/00* (2006.01)
(52) U.S. Cl. ................. 73/515.09; 73/514.05
(58) Field of Classification Search ............. 73/514.05, 73/514.06, 514.09, 514.12
See application file for complete search history.

(56) References Cited

U.S. PATENT DOCUMENTS

| | | | |
|---|---|---|---|
| 2,445,394 A | 7/1948 | Giralt | |
| 2,554,512 A | 5/1951 | Varian | |
| 3,241,374 A | 3/1966 | Menkis | |
| 5,417,111 A | 5/1995 | Sherman et al. | |
| 5,447,067 A | 9/1995 | Biebl et al. | |
| 5,487,305 A | 1/1996 | Ristic et al. | |
| 5,495,761 A | 3/1996 | Diem et al. | |
| 5,565,625 A | 10/1996 | Howe et al. | |
| 5,581,034 A | 12/1996 | Dao et al. | |
| 5,665,915 A | 9/1997 | Kobayashi et al. | |
| 5,719,333 A | 2/1998 | Hosoi et al. | |
| 5,747,353 A | 5/1998 | Bashiri et al. | |
| 5,817,942 A | 10/1998 | Greiff | |
| 6,171,880 B1 | 1/2001 | Gaitan et al. | |
| 6,182,509 B1 | 2/2001 | Leung | |
| 6,223,598 B1 | 5/2001 | Judy | |
| 6,294,400 B1 | 9/2001 | Stewart et al. | |

OTHER PUBLICATIONS

"A Micromachined Thermal Accelerometer", Bugnacki, Mike et al., Sensors, Jun. 2001, vol. 18, No. 16.*

(Continued)

*Primary Examiner*—Helen Kwok
(74) *Attorney, Agent, or Firm*—Birch, Stewart, Kolasch & Birch, LLP

(57) ABSTRACT

A thermal bubble type micro inertial sensor formed by micromachining technology includes a substrate, a heater arranged on the substrate, four temperature sensing members, a cap arranged above the substrate to cover and encapsulate the heater and the temperature sensing members, and a liquid filled into a chamber formed between the cap and the substrate. The temperature sensing members are symmetrical arranged at opposite sides of the heater and on the substrate, respectively, to sense the temperature difference beside the heater. The heater heats and partially vaporizes the liquid to form a thermal bubble in the liquid environment. Controlling the liquid characteristics and heater temperature may control the bubble size and enable the temperature sensing members to sense the temperature distribution variation. The sensor may serve as an inclinometer to sense the tilt, as well as an accelerometer to measure the acceleration.

20 Claims, 10 Drawing Sheets

OTHER PUBLICATIONS

Liwei Lin, "Liquid-Vapor Phase Transition and Bubble Formation in Micro Structures", Thermal Science & Engineering, vol. 2, No. 1, 1994.*

Yazdi et al., Proceedings of the IEEE, vol. 86, No. 8, pp. 1640-1659 (1998).

* cited by examiner

THERMAL BUBBLE TYPE MICRO INERTIAL SENSOR

This Nonprovisional application claims priority under 35 U.S.C. § 119(a) on Patent Application No(s). 091134748 filed in Taiwan on Nov. 29, 2002, the entire contents of which are hereby incorporated by reference.

BACKGROUND OF THE INVENTION

1. Field of the Invention

The invention relates to a micro inertial sensor, and more particularly to a thermal bubble type micro inertial sensor serving as an inclinometer and an accelerometer for sensing variations of position, tilt, and acceleration.

2. Description of the Related Art

Conventional mechanical type inertial sensors, such as an accelerometer and a gyroscope, are indispensable devices for navigation control. However, since the conventional inertial sensor is bulky and expensive in price, it is limited in various applications. Micro inertial sensors based on MEMS (Micro-Electro-Mechanical-System) technology are recently studied and developed well for realistic product. Using the MEMS technology to manufacture a micro inertial sensor, particularly a micro-accelerometer, may make the property of the sensor satisfying the commercial demands. For example, the sensitivity of the micro-accelerometer is higher, even to reach the detectable order of μg. The size of micro-accelerometer also can be miniaturized and the fabrication cost is cheap for mass production. So, it is suitable for applications of consumer electronics such as a vehicle, a joystick, a 3-D mouse, and the like. The associated reference has been disclosed in, for example, "Micromachined Inertial Sensors" to Yazdi et al., as attached to the specification.

In the prior arts, disclosed micro-accelerometers are mostly solid state sensors typically having a movable proof mass with at least one elastic beam for supporting the proof mass. There are various methods for fabricating the micro-accelerometers, which are mainly developed by way of silicon micromachining technology including polysilicon surface micromachining, as disclosed in U.S. Pat. Nos. 6,223,598B1; 5,487,305; 5,417,111; 5,565,625; 5,817,942 and 5,665,915; and SOI (Silicon on Insulator) surface micromachining, as disclosed in U.S. Pat. Nos. 6,294,400B1; 5,495,761; 5,747,353 and 5,447,067. However, the maximum drawback of such structures is that the fabrication yield rate is low and the elastically supported proof mass may be damaged by sticking effects or external shock forces.

Consequently, a gas convective accelerometer is developed, in which the natural principle of gas convection is utilized to replace the moveable proof mass in order to overcome the above-mentioned drawbacks, as disclosed in U.S. Pat. Nos. 2,445,394; 2,554,512; 3,241,374; and 5,581,034. The methods for forming the gas convective accelerometer by way of micromachining are disclosed in U.S. Pat. Nos. 5,719,333; 6,171,880; and 6,182,509. However, since the heat transfer speed of the gas is slow, the response speed of this gas convective accelerometer is quite slow (about 30 Hz), which limits its application. Moreover, since the accelerometer has to be packaged in a sealed chamber to control the environment pressure, the cost is greatly increased.

In view of this, the invention discloses a novel sensing mechanism to overcome the above-mentioned problems, wherein a thermal bubble type micro inertial sensor serves as an inclinometer or an accelerometer to achieve the advantages of quick response speed without a proof mass.

SUMMARY OF THE INVENTION

An object of the invention is to provide a thermal bubble type micro inertial sensor serving as an inclinometer and an accelerometer to sense the variations of position, tilt and acceleration. The micro inertial sensor utilizes the property of liquid with a higher density acting as a virtual proof mass to push a thermal bubble, which is formed by heating the liquid to its vaporization point, to move. Inside the thermal bubble, the temperature is higher than that of the surrounding liquid and a clear junction formed threat. So, the micro inertial sensor does not need any mechanical proof mass and advantageously has a quick response speed to overcome the drawbacks of the prior gas convective type.

Another object of the invention is to provide a structure, which includes a heater and a set of temperature-sensing members suspended above the substrate and formed by silicon micromachining technology that enhances the heating efficiency of the heater, the sensitivity of each temperature-sensing member, and thus the measurement capability of the micro inertial sensor.

Still another object of the invention is to provide a thermal bubble type micro inertial sensor, in which associated circuits are integrated on a single chip by silicon integrated circuit process technology. Thus, the cost of the sensor and the size of the sensor may be greatly reduced.

To achieve the above-mentioned objects, the invention provides a thermal bubble type micro inertial sensor including a substrate and a heater formed on the substrate by way of micromachining technology. At least two temperature sensing members are symmetrically arranged beside the heater to sense the temperature difference when the thermal bubble is pushed to move by inertial forces. A cap is arranged above the substrate to cover and encapsulate the heater and the at least two temperature sensing members. A liquid is filled into a chamber formed between the cap and the substrate.

DETAILED DESCRIPTION OF THE INVENTION

Figure 1:
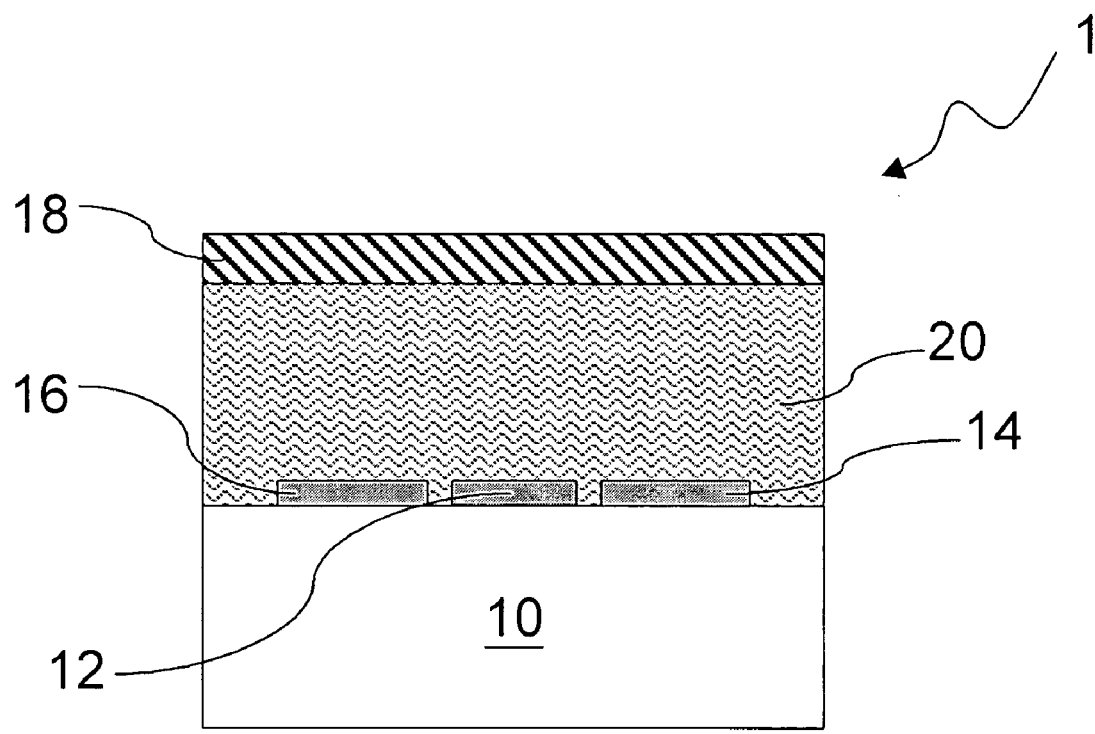
FIG. 1 is a cross-sectional view showing a structure of a thermal bubble type micro inertial sensor of the invention.

The operation principle of the thermal bubble type micro inertial sensor of the invention, which serves as an accelerometer (or micro-accelerometer) and an inclinometer will be described with reference to FIGS. 1 to 4. FIG. 1 is a cross-sectional view showing a structure of a thermal bubble type micro inertial sensor of the invention. Referring first to FIG. 1, the thermal bubble type micro inertial sensor 1 includes a substrate 10, a heater 12, temperature sensing members 14 and 16, a cap 18, and a liquid 20. The substrate 10 is typically a silicon substrate. The heater 12 is arranged on the substrate 10. The temperature sensing members 14 and 16 are symmetrically arranged on the substrate 10 and at opposite sides of the heater 12. The temperature sensing members 14 and 16 may sense the temperature difference beside the heater 12. The heater 12 and the temperature sensing members 14 and 16 may be formed of a metal material, such as platinum or tungsten, as well as a silicon or polysilicon material that is often used in the integrated circuit manufacturing processes. When the heater 12 is not heated, the temperature sensing members 14 and 16 are at the same ambient temperature. The cap 18 is above the substrate 10 to cover and encapsulate the heater 12 and the temperature sensing members 14 and 16. In addition, the liquid 20 is filled into a chamber formed between the cap 18 and the substrate 10 to create a liquid environment for the heater 12 and the temperature sensing members 14 and 16. The liquid 20 can be any kind of liquid or solution such as oil, deionized water and so on.

When the heater is heated till its temperature reaches the vaporization point of the liquid, a thermal bubble surrounded by the liquid is gradually formed around the heater due to phase transition from liquid to gas and the vapor bubble gradually grows up as the temperature keeps rising. The bubble is formed in a manner similar to the driving principle of a thermal bubble type ink-jet printer but different from that the bubble size is kept almost constant rather than bubble explosion in the ink-jet application. In this invention, controlling the heater temperature and liquid characteristics may control the bubble size and thus the sensitivity of the thermal bubble type micro inertial sensor 1.

Figure 2:
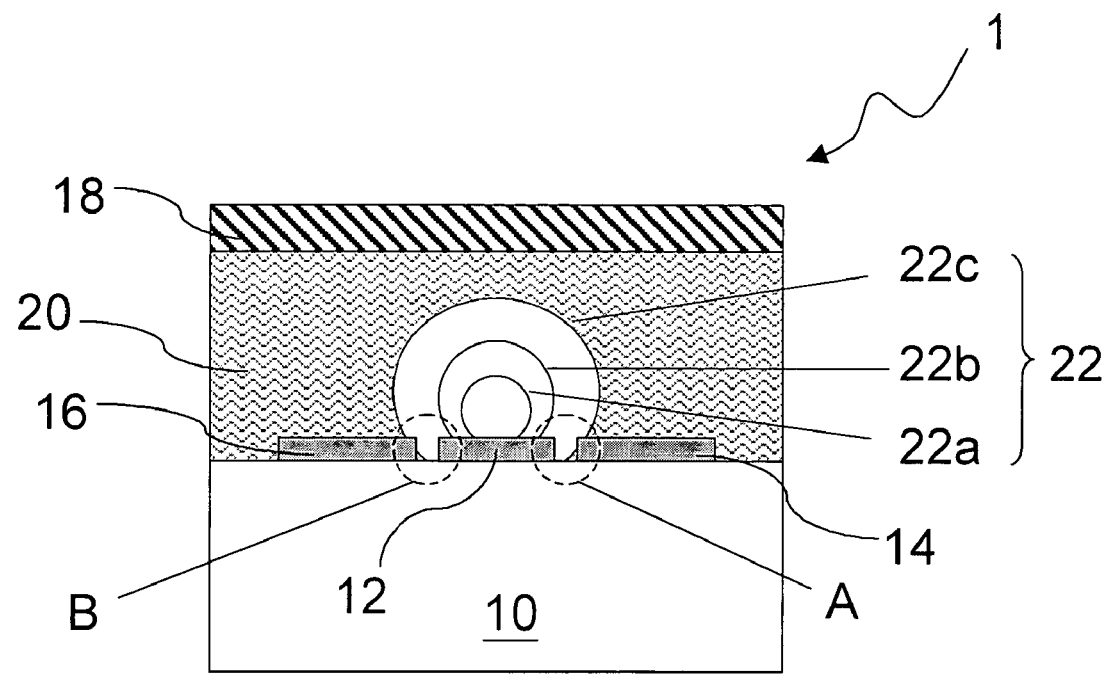
FIG. 2 is a schematic illustration showing a high temperature bubble formed in the thermal bubble type micro inertial sensor of the invention and the temperature gradient distribution of the bubble.

As shown in FIG. 2, the formed high temperature bubble 22 is actually a bubble having continuous temperature gradient distributions including isothermal contours 22a, 22b and 22c as shown in the drawing. The isothermal contour closer to the heater 12 has a higher temperature, while the isothermal contour in the junction with the liquid 20 has a temperature equal to the vaporization point of the fluid. For example, the isothermal contour in the junction with the water has a temperature of 100° C. When no external force is applied to the thermal bubble type micro inertial sensor 1 to change the inertial state thereof, the temperature sensing members 14 and 16 has no temperature difference between A and B (the size of the circle in FIG. 2 denotes the level of the temperature for simplicity).

Figure 3:
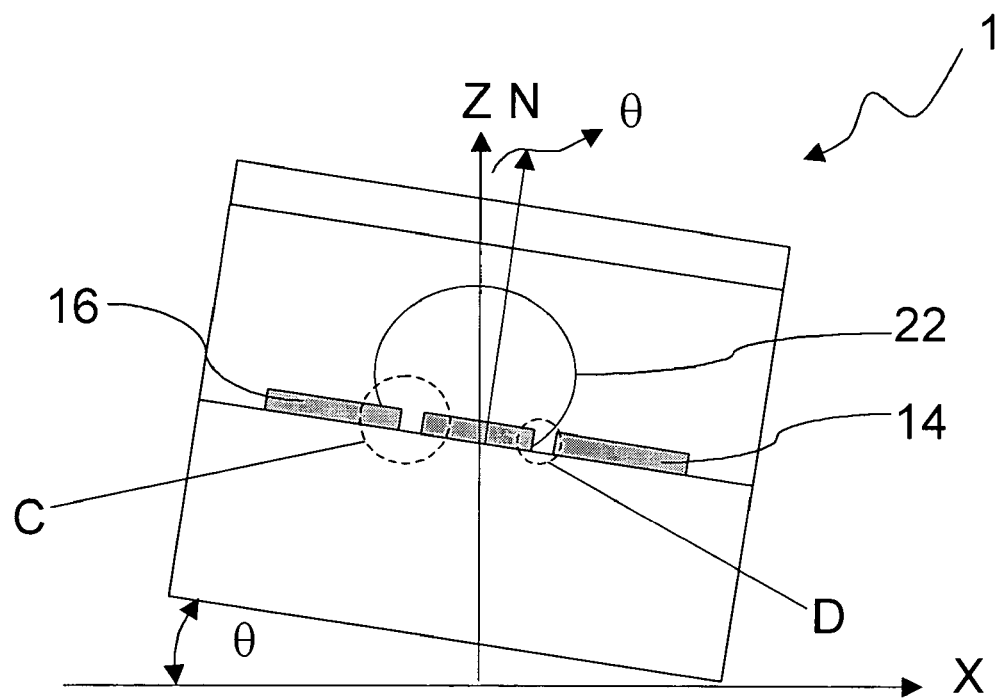
FIG. 3 is a schematic illustration for illustrating the thermal bubble principle of the thermal bubble type micro inertial sensor of the invention, which serves as an inclinometer.

FIG. 3 illustrates the principle of the thermal bubble type micro inertial sensor 1 of the invention serving as an inclinometer. When the thermal bubble type micro inertial sensor 1 is tilted an angle θ, due to the gravity effect, the direction of gravity Z of the bubble 22 naturally forms an angle θ with the direction of normal N perpendicular to the thermal bubble type micro inertial sensor 1. Thus, the temperature sensing member 16 is at higher temperature C, and the temperature sensing member 14 detects a lower temperature D. The tilt direction and magnitude may be measured by the temperature difference between C and D.

Figure 4:
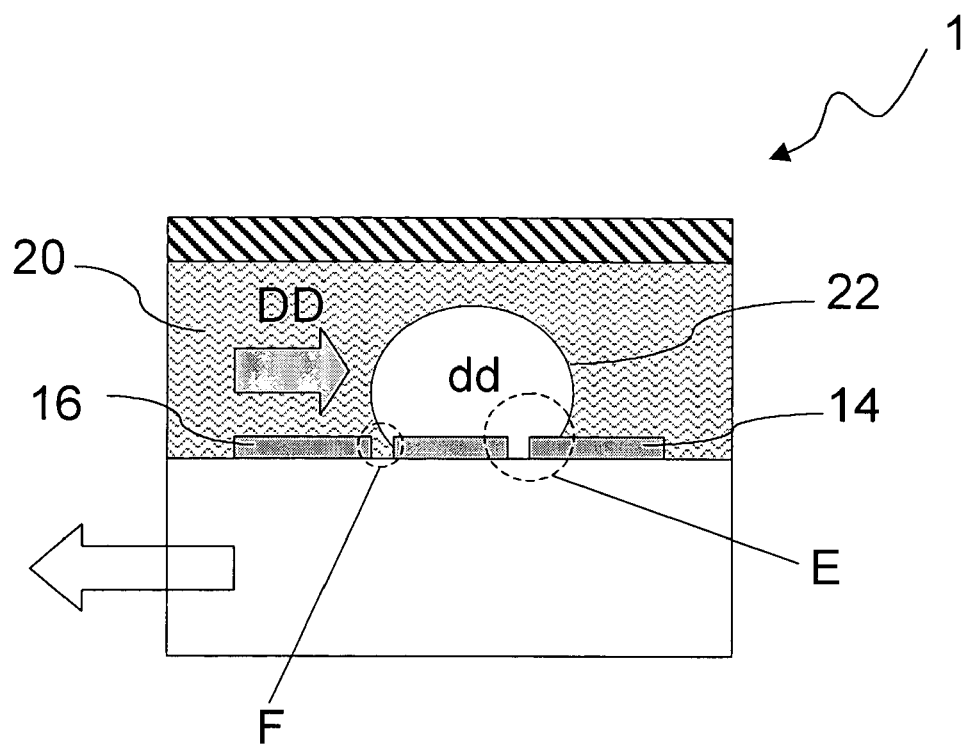
FIG. 4 is a schematic illustration for illustrating the thermal bubble principle of the thermal bubble type micro inertial sensor of the invention, which serves as an accelerometer.

FIG. 4 illustrates the principle of the thermal bubble type micro inertial sensor I of the invention serving as a micro-accelerometer. When the sensor 1 is linearly accelerated, the liquid 20 acting as a virtual proof mass with higher density D therefore pushes the gas bubble 22 to move at the same direction of the acceleration. Thus, the temperature E is greater than the temperature F. The direction and magnitude of the acceleration may be detected and calibrated by comparing E to F. Different from the prior art of convective thermal accelerometer, the liquid virtual proof mass is superior to the gas virtual proof mass and has a response speed up to hundreds Hz or even higher, which effectively overcomes the drawback of the low response speed (about 30 Hz) of the gas convective accelerometer.

In order to enhance the heating efficiency of the heater 12 and the sensitivities of the temperature sensing members 14 and 16, the invention may further utilize the silicon micromachining technology to form the above-mentioned heater 12 and the temperature sensing members 14 and 16. More particularly, the invention may utilize the CMOS manufacture processes and their subsequent micromachining processes to form the suspending heater 12 and the temperature sensing members 14 and 16. The major advantage of this way is that the signal processing circuits may be integrated on a single chip so that the size and cost may be reduced.

Figure 5:
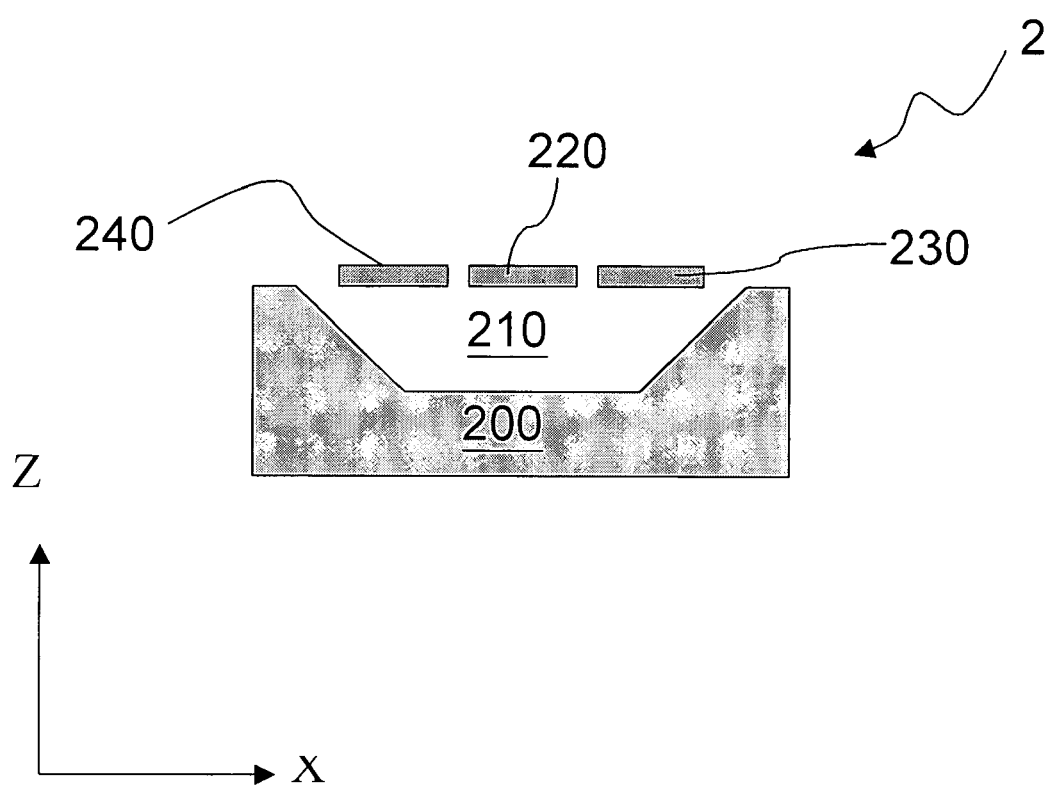
FIG. 5 is a cross-sectional view showing the structure of the micro inertial sensor of one embodiment of the invention formed by using micromachining technology.
Figure 6:
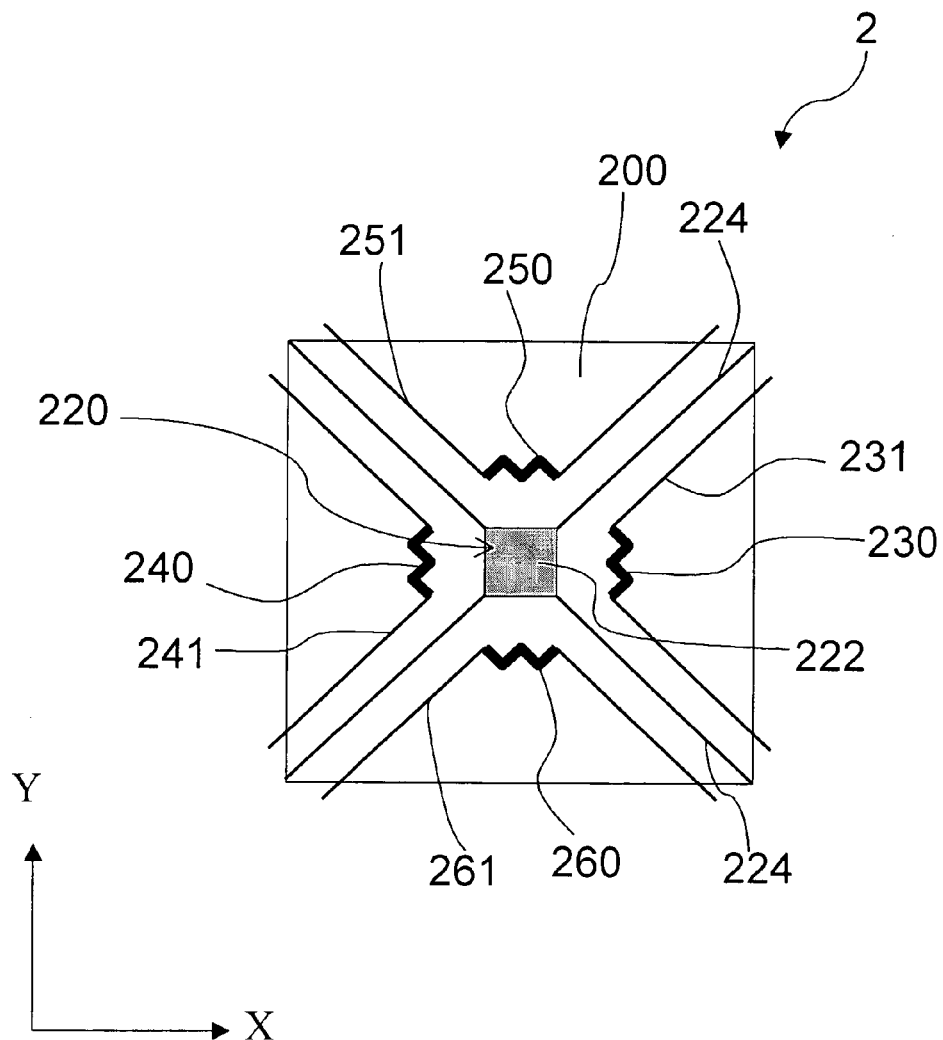
FIG. 6 is a top view of FIG. 5.

FIGS. 5 and 6 are cross-sectional and top views schematically showing the structure of the thermal bubble type initial sensor according to one embodiment of the invention, which is formed by CMOS manufacture processes and their subsequent micromachining processes, respectively, wherein the liquid 20 and the cap 18 are not shown for the sake of simplicity. Since the CMOS manufacture processes are well known skills, detailed descriptions thereof will be omitted. Instead, only the materials and the processes used in this invention will be described. The sensor 2 includes a silicon substrate 200, which is typically a silicon wafer having an orientation of (100). A V-groove 210 is formed on the silicon substrate 200 using silicon anisotropic etching so that a heater 220 and the temperature sensing members 14 and 16 are suspended above the V-groove 210. The heater 220 is composed of a suspended membrane 222 and four symmetrical, bridge beams 224 extending outwardly from four corners of the suspended membrane 222 in directions parallel to the suspended membrane 222. Thus, the suspended membrane 222 is suspended above the V-groove 210 of the silicon substrate 200 by the bridge beams 224. Four temperature sensing resistors (members) 230, 240, 250 and 260 having the same structure are formed around the heater 220 in X-axis and Y-axis directions in an equally spaced manner, and are suspended above the V-groove 210 by the supporting of the bridge beams 231, 241, 251 and 261.

For example, the temperature sensing resistors 230, 240, 250 and 260 are thermisters, and the material for forming the heater 220 and the temperature sensing resistors 230, 240, 250 and 260 may be polysilicon material available in the CMOS process. Alternatively, the material is such that a portion of the silicon substrate 200 is undercutted by way of silicon deep etching (e.g., the inductively coupled plasma-reactive ion etching, ICP-RIE) in conjunction with the $XeF_2$ isotropic etching (for example, the STS company in United Kingdom may provide a commercial machine with dual functions) to form the suspended silicon structure including the heater 220 and the temperature sensing resistors 230, 240, 250 and 260.

Figure 7:
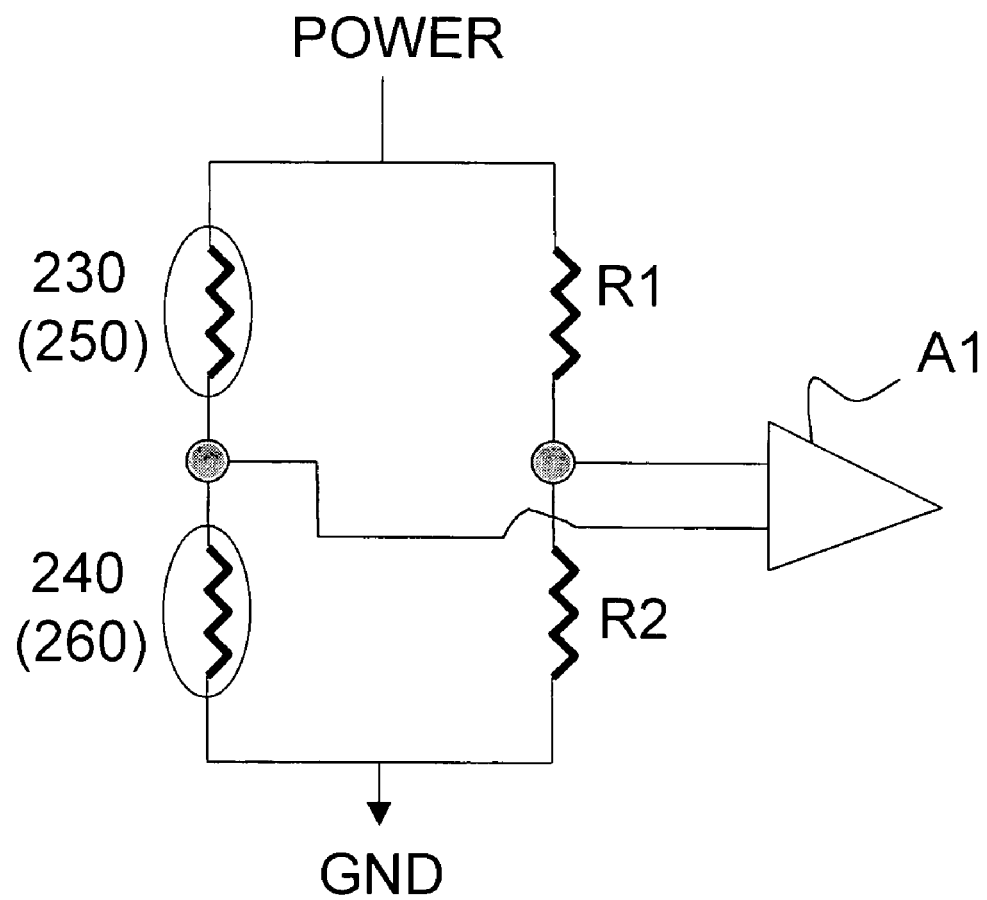
FIG. 7 is a schematic illustration showing the micro inertial sensor of FIGS. 5 and 6 having a bridge circuit arrangement.

As shown in FIG. 7, the thermal bubble type micro inertial sensor 2 in conjunction with a bridge circuit may become an electric measurement device such as an accelerometer or inclinometer, wherein the corresponding temperature sensing resistors 230 and 240 (or 250 and 260) are arranged at two sides of the output terminal of the bridge circuit in conjunction with resistors R1 and R2 such that the signal difference is read by a differential amplifier A1. In this invention, it can detect the variation produced in X and Y directions, so a first bridge circuit composed of the temperature sensing resistors 230 and 240, and a second bridge circuit composed of the temperature sensing resistors 250 and 260 have to be provided.

Figure 8:
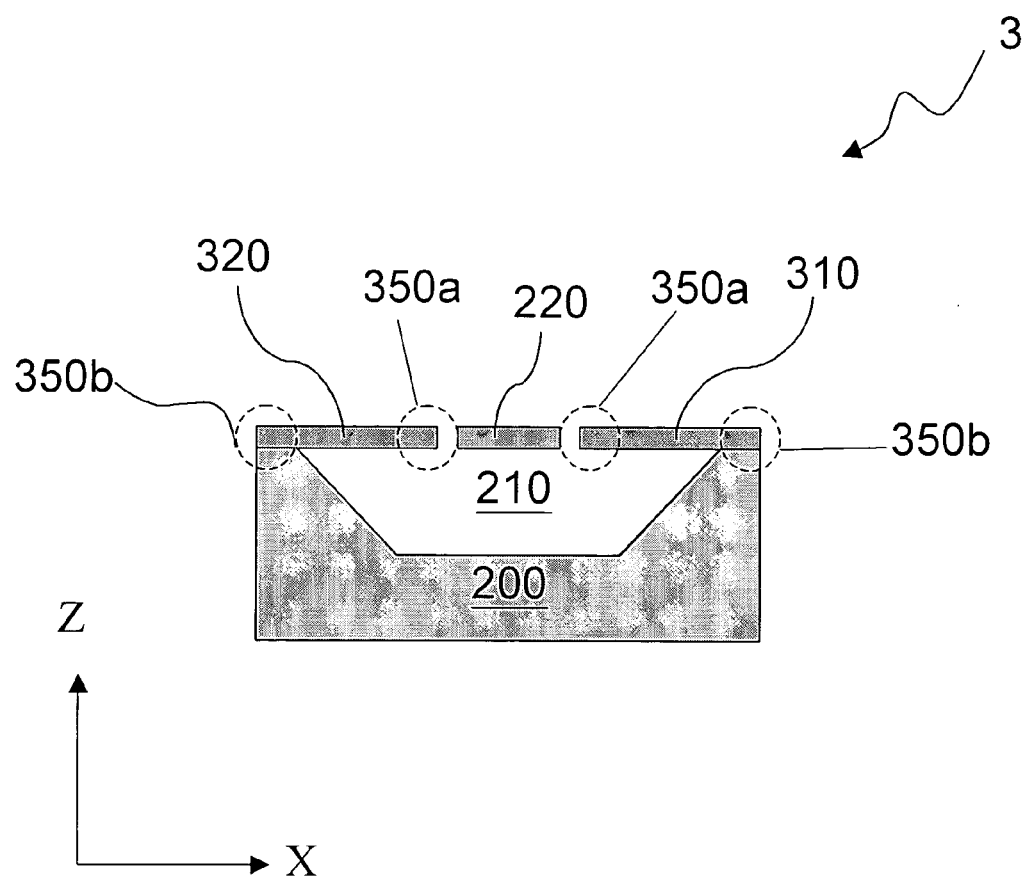
FIG. 8 is a cross-sectional view showing the structure of the micro inertial sensor of another embodiment of the invention formed by using micromachining technology.
Figure 9:
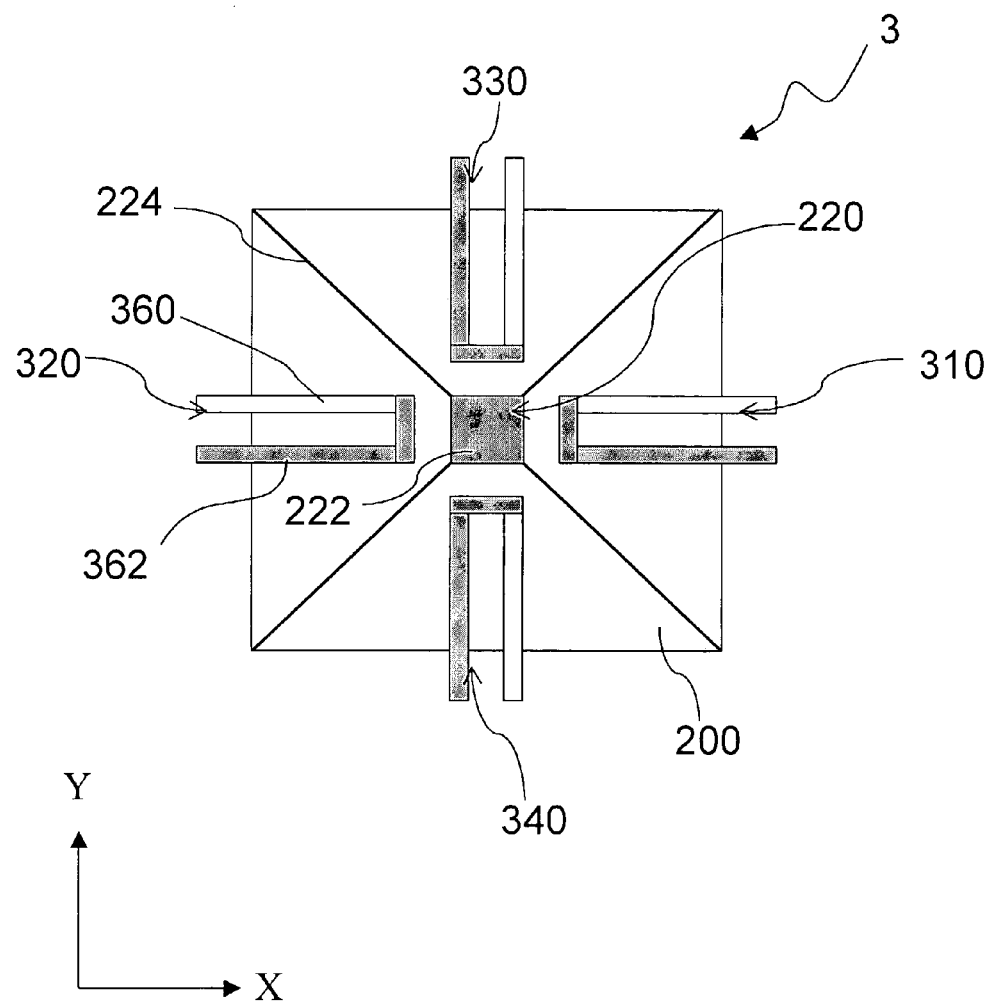
FIG. 9 is a top view of FIG. 8.

FIGS. 8 and 9 are cross-sectional and top views showing the structure of the micro inertial sensor according to another embodiment of the invention, which is formed by the CMOS process and their subsequent micromachining processes, respectively, wherein the liquid 20 and the cap 18 are also not shown for the sake of simplicity. The thermal bubble type micro inertial sensor 3 of this embodiment differs from that of FIGS. 5 and 6 in that the temperature sensing resistors 230, 240, 250 and 260 are replaced by thermocouples 310, 320, 330 and 340 or thermopiles 310, 320, 330 and 340 composed of several serially connected thermocouples. Each thermocouple/thermopile 310, 320, 330, 340 has a hot junction (first end) 350a adjoining or connected to the heater 220, and a cold junction (second end) 350b away from the heater 220. The hot junction (first end) 350a is suspended above the V-groove 210, and the cold junction (second end) 350b is connected to the silicon substrate 200. Each thermocouple includes a first thermoelectric member 360 made of polysilicon or silicon formed by the above-mentioned method, and a second thermoelectric member 362 composed of the material, such as aluminum or alloy thereof, copper or alloy thereof, or titanium or titanium nitride, forming the interconnect metal in CMOS process. The second thermoelectric member 362 may be an interconnect metal layer.

Figure 10:
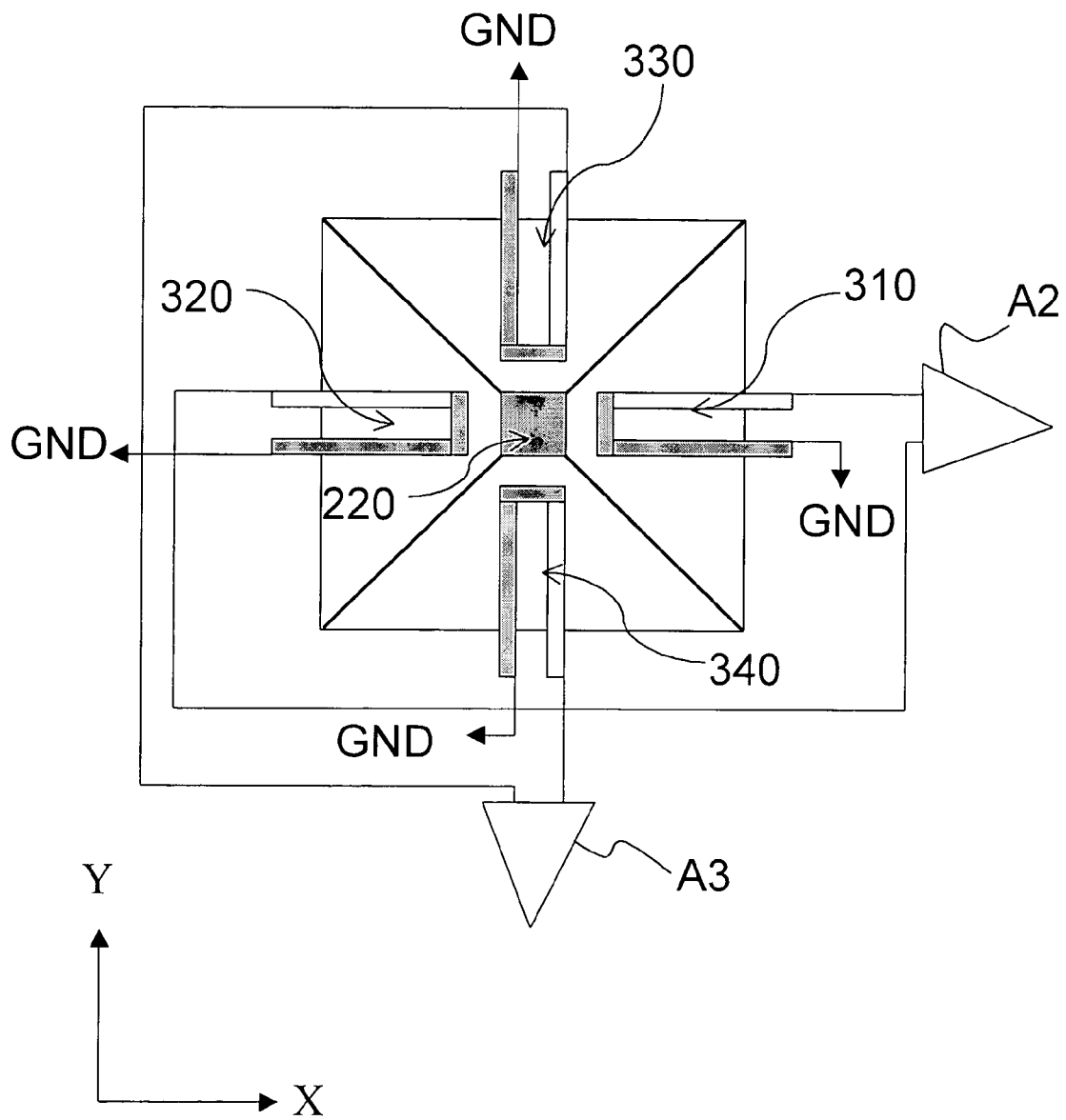
FIG. 10 is a schematic illustration showing the micro inertial sensor of FIGS. 7 and 8 having differential amplifiers and serving as a measurement device.

Similarly, the thermal bubble type micro inertial sensor 3 may become an electric measurement device such as an accelerometer or inclinometer by proper circuit arrangement, as shown in FIG. 10, which is a schematic illustration showing the thermal bubble type micro inertial sensor 3 having two differential amplifiers and serving as a measurement device. The corresponding thermocouples/thermopiles 310 and 320 in X-axis are connected to a differential amplifier A2, and the corresponding thermocouples/thermopiles 330 and 340 in Y-axis are connected to another differential amplifier A3 so that the magnitude and direction of the acceleration or tilt may be determined.

The thermal bubble type micro inertial sensor of the invention utilizes the property of forming a clear junction or interface between a liquid, which has good thermal conductivity and higher molecule density, and a thermal bubble, which is formed under high temperature, to produce an inclinometer or an accelerometer to sense the variations of positions, tilts and accelerations. Thus, the sensor of the invention advantageously has a quick response speed and does not need any proof mass. On the other hand, the invention forms the structure, which is suspended above the substrate and has the heater and temperature sensing members, by way of silicon micromachining, to enhance the heating efficiency of the heater and the sensitivity of the temperature sensing members, and thus to effectively enhance the measurement capability of the micro inertial sensor. In addition, using the micromachining technology may integrate associated circuits on a single chip so that the cost and size may be advantageously reduced.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A thermal bubble type micro inertial sensor, comprising:
   a substrate;
   a heater arranged on the substrate;
   at least two temperature sensing members symmetrical arranged at opposite sides of the heater and on the substrate, respectively, to sense a temperature difference beside the heater;
   a cap arranged above the substrate to cover and encapsulate the heater and the at least two temperature sensing members; and
   a liquid filled into a chamber formed between the cap and the substrate, wherein when the heater is heated till a temperature of the heater reaches a vaporization point of the liquid, a thermal bubble surrounded by the liquid is gradually formed around the heater due to phase transition from liquid to gas, and a size of the bubble is kept substantially constant as the temperature difference is being sensed.

2. The micro inertial sensor according to claim 1, wherein the substrate is a silicon substrate.

3. The micro inertial sensor according to claim 1, wherein a material of the heater is selected from one of the group consisting of a metal material, polysilicon and silicon.

4. The micro inertial sensor according to claim 1, wherein a material of each of the at least two temperature sensing members is selected from one of the group consisting of a metal material, polysilicon and silicon.

5. The micro inertial sensor according to claim 3, wherein the metal material is selected from one of platinum and tungsten.

6. The micro inertial sensor according to claim 4, wherein the metal material is selected from one of platinum and tungsten.

7. The micro inertial sensor according to claim 1, wherein the liquid is water.

8. The micro inertial sensor according to claim 1, wherein the substrate is formed with a groove so that the heater and the at least two temperature sensing members are suspended above the groove of the substrate.

9. The micro inertial sensor according to claim 8, wherein the heater is composed of a suspended membrane and a plurality of symmetrical, bridge beams extending outwardly from four corners of the suspended membrane in directions parallel to the suspended membrane, and the heater is supported by the bridge beams and suspended above the substrate.

10. The micro inertial sensor according to claim 8, wherein the groove is formed by way of anisotropic etching.

11. The micro inertial sensor according to claim 9, wherein each of the at least two temperature sensing members is supported by at least one of the bridge beams and suspended above the substrate.

12. The micro inertial sensor according to claim 1, wherein each of the at least two temperature sensing members is a thermister.

13. The micro inertial sensor according to claim 8, wherein each of the at least two temperature sensing members is a thermocouple.

14. The micro inertial sensor according to claim 8, wherein each of the at least two temperature sensing members is a thermopile having multiple thermocouples connected in series.

15. The micro inertial sensor according to claim 13, wherein the thermocouple has a first end connected to the heater and suspended above the groove of the substrate, and a second end connected to the substrate.

16. The micro inertial sensor according to claim 14, wherein the thermopile has a first end connected to the heater and suspended above the groove of the substrate, and a second end connected to the substrate.

17. The micro inertial sensor according to claim 13, wherein the thermocouple comprises a first thermoelectric member and a second thermoelectric member.

18. The micro inertial sensor according to claim 17, wherein the first thermoelectric member is made of polysilicon or silicon, and the second thermoelectric member is an interconnect metal layer.

19. The micro inertial sensor according to claim 1 being applied to a micro-accelerometer.

20. The micro inertial sensor according to claim 1 being applied to an inclinometer.

* * * * *